Dec. 28, 1943. R. BENNETT 2,338,021
PRESSURE CONTROLLED SYSTEM
Filed Feb. 8, 1941 3 Sheets-Sheet 1

INVENTOR
R. BENNETT
BY Blair & Kilcoyne
ATTORNEYS

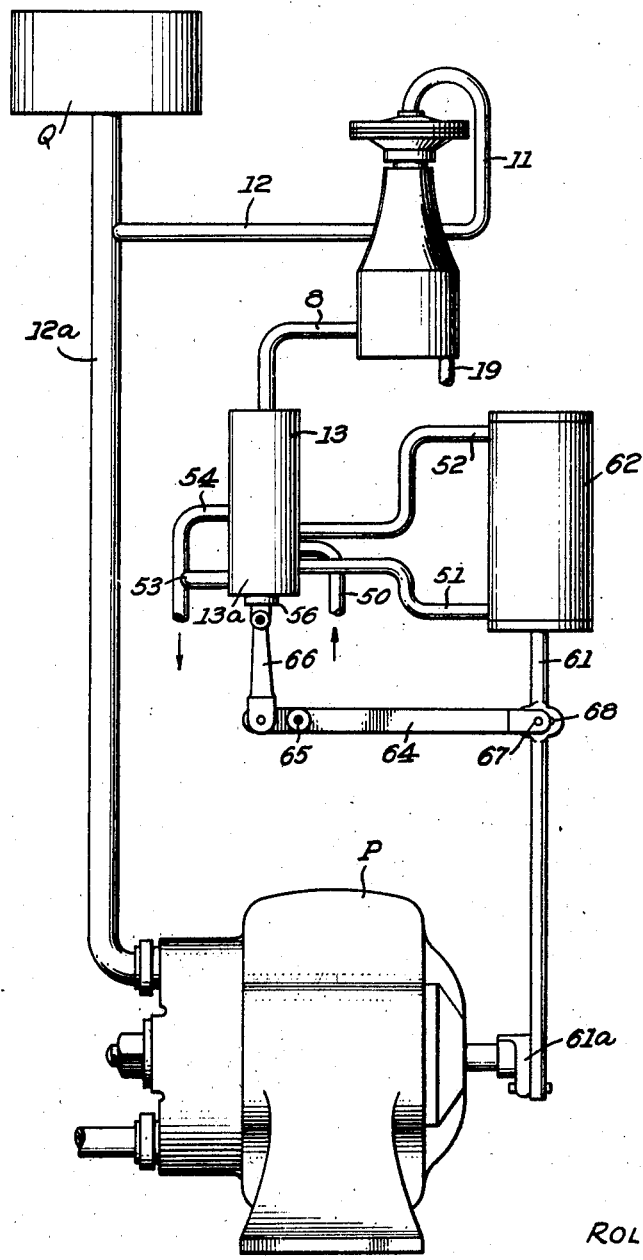

Patented Dec. 28, 1943

2,338,021

UNITED STATES PATENT OFFICE 2,338,021

PRESSURE CONTROLLED SYSTEM

Roland Bennett, Westminster, London, England

Application February 8, 1941, Serial No. 378,091
In Great Britain February 10, 1940

4 Claims. (Cl. 103—9)

This invention relates to apparatus for controlling systems in which fluid has to be supplied at a pressure that does not deviate from a predetermined value except within small and well defined limits.

According to the present invention, a controlled member is arranged to compensate for any changes in pressure in a main fluid system in accordance with variations in the pressure exerted by the system on a diaphragm controlling a valve which, in turn, controls the pressure of a fluid column interposed between the valve and the controlled member. Thus, the arrangement is in the nature of a hydraulic amplifier, such that a slight deflection of the diaphragm due to a slight change in the pressure of the main fluid system causes a comparatively large movement of the controlled member, and this in turn causes the necessary correction of the pressure in the main system. The valve may have a pair of pistons between which the fluid for the fluid column, which may be said to constitute a secondary fluid system, is admitted under pressure, and this fluid may be received from the main system.

In order that the invention may be clearly understood and readily carried into effect, apparatus in accordance thereby will now be described, by way of example, with reference to the accompanying drawings, in which—

Figure 1a is a diagram showing the manner in which the apparatus on Figure 1 is made use of in practice.

Figure 1:
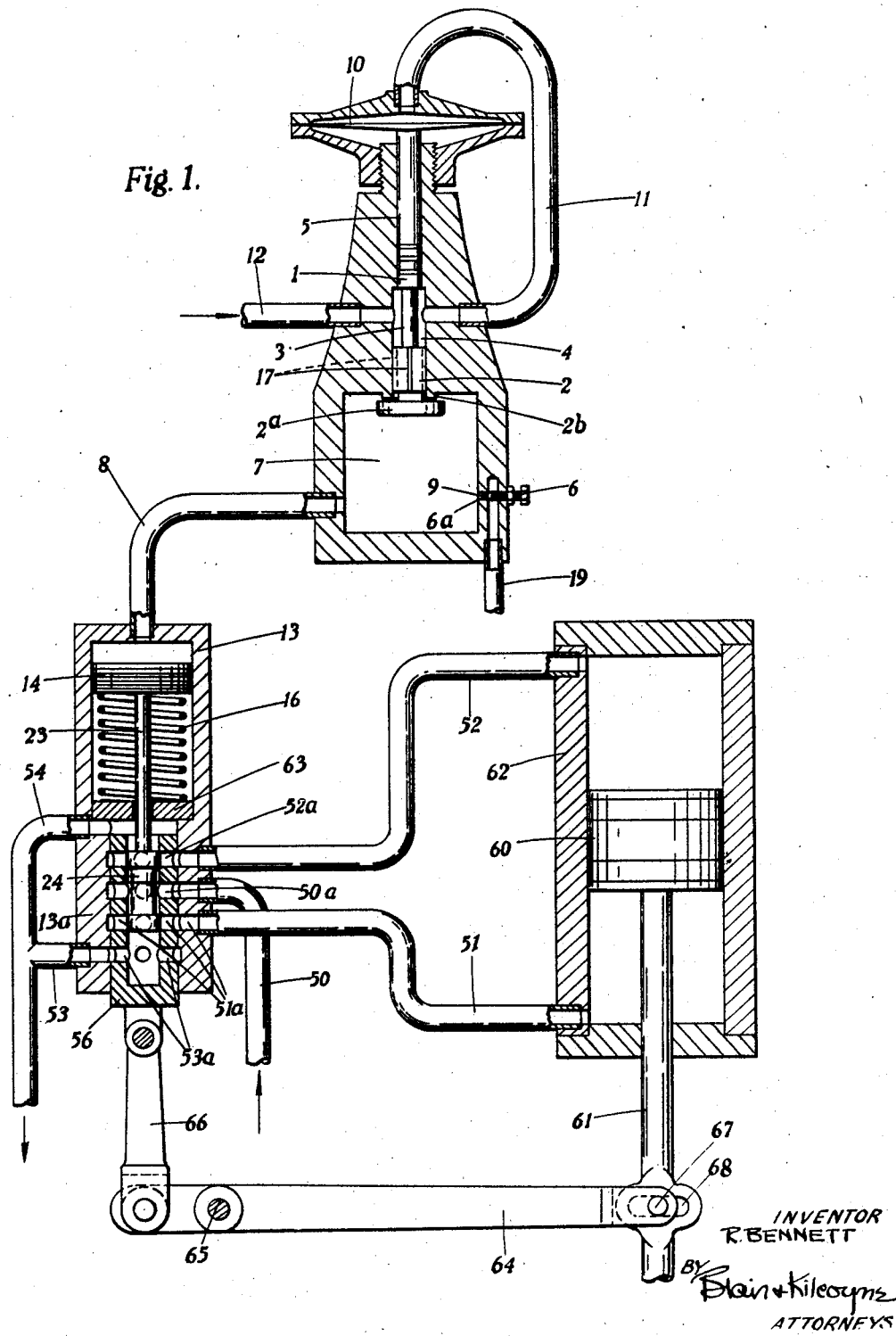
Figure 1 is a diagrammatic sectional elevation of one form of apparatus.

The apparatus in Figure 1 comprises a reducing valve having opposed pistons 1 and 2 controlling the pressure in a column of fluid contained in a space 7, a pipe 8 and the upper end of a cylinder 13. The latter contains a controlled member in the form of a piston 14 on the remote side of which a compression spring 16 acts. The piston 2 is formed so as to act as a valve for admitting fluid under pressure to the space 7, and when the system is in equilibrium a small quantity of fluid passes the piston 2 to the space 7, this quantity being equal to the amount of fluid that leaks from the fluid column through a port 9 to a discharge pipe 19. The quantity of fluid that can leak through the port 9 may be adjusted manually through the medium of a set screw 6 having a tapered end 6a.

When the piston 14 is to be moved to a new position against the action of the compression spring 16, the pistons 1 and 2 are moved downwards (as viewed in Figure 1) so as to increase the rate at which the fluid enters the fluid column. When, however, the piston 14 is to be moved in the opposite direction by the spring 16, the pressure in the fluid column is reduced by allowing the pistons 1 and 2 to move upwards so that the quantity of fluid entering the space 7 is less than the quantity of fluid escaping through the port 9. The means for adjusting the position of the pistons 1 and 2 comprise a diaphragm 10, the upper surface of which closes a space comprising a pipe 11 leading to a space 4 between the pistons 1 and 2.

A pipe 12 connects the space 4 with a delivery pipe 12a (Figure 1a) leading from a pump P that is to deliver fluid at a substantially constant pressure along pipe 12a to the point Q where such fluid is required. This pump P is of the type (well known in the art) that has a variable stroke, and the apparatus appearing in Fig. 1 of this specification serves the purpose of controlling the stroke of the pump in such a way as to compensate for any variations in the pressure of the pump output.

It will be seen that the diaphragm 10 bears upon the upper end of the piston 1, which is of considerable length and which slides in a cylinder 5 that constitutes a co-axial extension of the space 4 which, in turn, is constituted by the upper end of the cylinder in which the piston 2 slides. The piston 2 has a larger diameter than the piston 1, and a rod 3 connects the two pistons so that an integral piston unit is provided. The piston 2 carries a head 2a which can bear against an annular projection 2b in the space 7 so as to prevent any fluid under pressure from passing between the spaces 4 and 7. When, however, the head 2a is separated from the projection 2b, fluid under pressure passing through slots 17, formed parallel to the piston axis along the curved surface of the piston 2, can enter the space 7.

When the system is in equilibrium, there is no resultant force tending to move the pistons 1 and 2 axially. The resultant downward force due to the pressure between the pistons 1 and 2 together with the pressure upon the diaphragm 10 being balanced by the upward pressure upon the piston 2 and the force due to the strain in the diaphragm itself.

Now supposing that there is a small but undesirable increase in the output pressure of the pump P (Figure 1a), this results in an increase in the pressure of the fluid contained in the pipes 12a, 12 and 11, the space 4 and the space immediately above the diaphragm 10. The diaphragm 10, therefore, is further stressed and strained to a greater extent so that it pushes the pistons 1 and 2 downwards a small amount with the result that the quantity of fluid entering the space 7 is greater than the quantity leaking through the port 9. The pressure in the fluid column consequently increases and the piston 14 is pushed downwards against the action of the spring 16, a piston valve 24 connected by a piston rod 23 to the piston 14 being also moved downwards. This piston valve 24 forms part of servo-mechanism for controlling the stroke of the pump P, the control being effected through the medium of a piston 60 connected to the pump by a piston rod 61 and a lever 61a (Figure 1a).

The piston valve 24 slides in a sleeve 56 which in turn can slide in a cylinder 13a, the interior of which is separated from the interior of cylinder 13 by a plate 63 which serves as the abutment necessary for the end of the spring 16 remote from the piston 14. When the piston valve 24 is moved downwards as aforesaid, fluid under pressure passes from a pipe 50 through ports 50a and 51a, formed in the sleeve 56, and a pipe 51 to the lower end of a cylinder 62 which contains the piston 60. Fluid above the piston 60 can escape from the cylinder 62 through a pipe 52, ports 52a, formed in the sleeve 56, and an exhaust pipe 54.

In order that the piston 60 shall move to a position corresponding to the position of the piston valve 24, it is necessary for the supply of fluid under pressure to the cylinder 62 to be cut off after a short time corresponding to the distance through which the piston valve 24 has been moved. This cut-off is effected through the medium of the sleeve 56 which is caused by the piston 60 to follow the piston valve 24 until the ports 51a and 52a are again closed. The connection between the sleeve 56 and the piston 60 is constituted by a lever 64, pivoted about a fixed axis 65, and a link 66. The lever 64 carries a pin 67 that lies in a transverse slot 68 formed in the piston rod 61. Thus, when the piston 60 moves upwards, the slot 68 acts on the pin 67 to swing the lever 64 in a counter-clockwise direction and pull the sleeve 56 downwards until the fluid supply to the cylinder 62 is cut off and the movement of the piston 60 consequently ceases.

When there is a slight decrease in the pressure on the delivery side of the pump, the pressure above the diaphragm 10 is correspondingly reduced so that the pressure acting upwardly on the pistons 1 and 2 can lift these pistons slightly and thereby reduce the pressure above the piston 14 on account of the lack of compensation for the leakage that takes place through the port 9. The spring 16, therefore, moves the piston 14 upwards, as well as the piston valve 24. Accordingly, fluid under pressure passes from a pipe 50 through ports 50a and 52a, formed in the sleeve 56, to the pipe 52 which leads to the upper end of the cylinder 62. The piston 60 is therefore urged downwards, whilst exhaust from the cylinder 62 passes through the pipe 51 and the ports 51a and 53a to the exhaust pipe 53. After a predetermined time the ports 51a and 52a are closed as a result of the upward movement of the sleeve 56, caused by the piston rod 61 acting through the lever 64 and the link 66.

It will be seen, therefore, that, when the pressure in pipes 12a, 12 and 11 increases, the stress in the diaphragm 10 is increased and the piston 60 is moved downwards and thereby, through the rod 61 and lever 61a, decreases the stroke of the pump P to decrease the pressure in the pipe 12a and compensate for the increase in pressure which effected the movement. On the other hand, when the pressure above the diaphragm 10 decreases so that the piston 60 is caused to descend, as viewed in Figure 1, the stroke of the pump P is increased and the pressure in the pipe 12 is increased.

Figure 2:
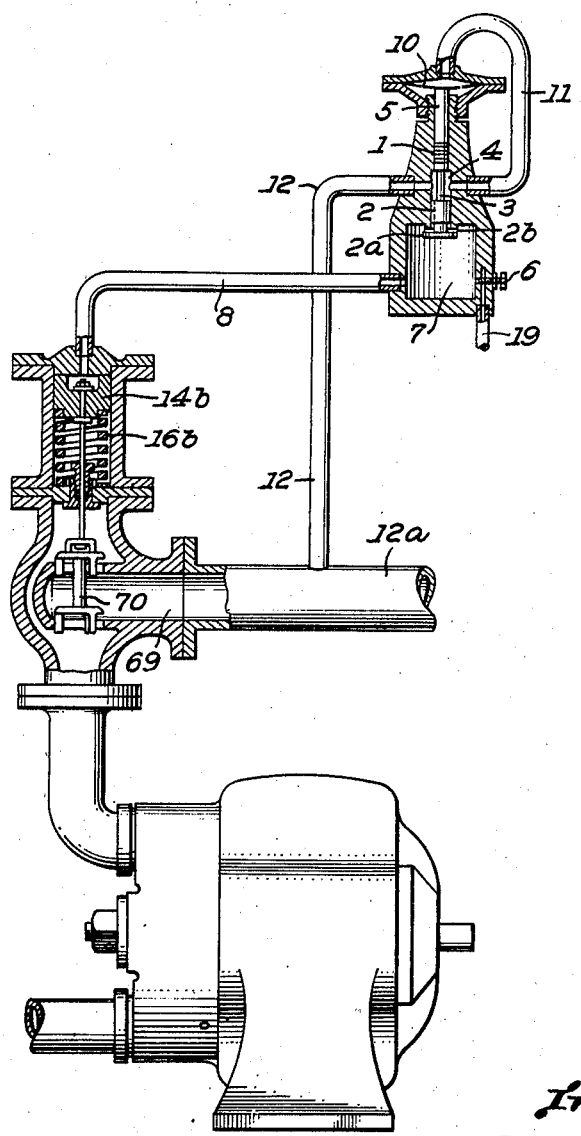
Figure 2 is a diagrammatic elevation partly in section of a further form of apparatus.

Figure 2 shows the manner in which the mechanism in the upper part of Fig. 1, that is to say the mechanism comprising the pistons 1 and 2 and the diaphragm 10, may be used in conjunction with a throttle valve to maintain constant the pressure of fluid passing through a conduit. In this arrangement, the pipe 8 leading from the space 7 is connected to the upper end of a cylinder 13b containing a piston 14b loaded by a compression spring 16b. The action of the piston 14b and spring 16b is precisely similar to the action of the piston 14 and spring 16 in Figure 1. The outlet side 69 of the throttle-valve 70, which is a balanced throttle-valve of standard construction, is in communication through the pipes 11 and 12 with the top of the diaphragm 10. Thus, when there is an undesired increase in pressure, the diaphragm 10 is deflected downwardly and there is a corresponding movement of the piston 14b. This results in the throttle-valve 70 being moved downward so as to reduce the pressure on the outlet side of the valve. Alternatively, when there is an undesired decrease in pressure on the outlet side of the valve, the throttle-valve 70 is caused to rise.

The pressure responsive apparatus may be used to control contrivances other than a variable stroke pump or a throttle-valve, for example the apparatus may be used in conjunction with a variable speed gear driving a chain grate stoker, or a variable baffle controlling the draught from a furnace.

It will be seen that in each example described above the fluid pressure acting on the diaphragm 10 constitutes an adjustable loading means, and when the pressure on the diaphragm 10 is slightly increased to cause a small increase in the strain in and, therefore, the deflection of the diaphragm, the pistons 1 and 2 are moved a small distance to increase the rate at which fluid is supplied past the valve elements 2a, 2b and to the fluid column contained in the space 7, the pipe 8 and the space above the piston 14 or 14b. Thus, fluid is admitted to the column from the space between the pistons 1 and 2 at a greater rate than the rate at which the fluid is discharged from the column through the "bleeder" port 9. The pressure in the fluid column, therefore increases until a new condition of equilibrium is reached and the piston 14 or 14b is moved by this increase in pressure, whilst the spring 16 or 16b is compressed. Clearly, the movement of the piston 14 or 14b, which constitutes the controlled member, is very considerably greater than the deflection of the diaphragm which causes such movement and the comparatively large movement of the controlled member 14 or 14b causes the necessary correction of the pressure in the pipe 12a in which the pressure is to be maintained substantially constant. The diaphragm 10 is continuously strained by the pressure above it and it is the slight changes in strain due to slight changes in the pressure above it that bring about the controlling movements of the pistons 1 and 2.

When the new condition of equilibrium is being reached, in which condition the piston 14 or 14b has been moved downwards against the spring 16 or 16b, the increase in pressure in the fluid column in pipe 8, space 7 and the space above the piston 14 or 14b causes the pair of pistons 1 and 2 to return very nearly to its initial position and the small increase in the strain in or deflection of the diaphragm 10 very nearly to vanish, the slightly increased pressure on the diaphragm being balanced by the increased tension in the diaphragm and the increase of pressure acting upwards on the larger of the two pistons 1 and 2, that is on the piston 2. There is then equilibrium between, on the one hand, the force due to the pressure on the diaphragm 10 together with the resultant force due to the pressure between the two pistons 1 and 2 and, on the other hand, the force due to the pressure in the fluid column upon the larger one of the two pistons and the force due to the stress in the diaphragm 10. The stress in the diaphragm itself counterbalances most of the load due to the pressure on the diaphragm. It has been found that when once a condition of equilibrium has been reached, the pistons 1 and 2 undergo no perceptible movement and their positions depend upon the rate at which the "bleeder" port 9 permits the escape of fluid from the column in the space 7, the pipe 8 and the space above the piston 14 or 14b. This rate of escape in the equilibrium condition is the same as the rate at which fluid enters the column between the valve elements 2a and 2b. It may be mentioned that the changes in the deflection of the diaphragm are practically imperceptible, so that, while the position of the piston 14 or 14b is being changed, there is scarcely any perceptible departure of the diaphragm 10 from its normal deflection or strain under the predetermined pressure to be kept constant in the pipe 12a.

If the sizes of the parts are properly chosen, the pressure in the constant pressure system in the pipes 12a, 12 and 11 can be kept automatically within small and well defined limits and, in calculating the dimensions, the known theory relating to small strains in a circular plate clamped at its edge is made use of. It can, in fact, be shown that the percentage pressure variation that can occur in the constant pressure system is a function only of the diameters of the small piston 1 and of the diaphragm 10. This result is arrived at by equating the additional small deflection of the diaphragm 10 that would occur, on account of a small increase of the fluid pressure distributed over its upper surface, to the opposing deflection that would occur as a result of the increased pressure on the inner face of the smaller piston 1 which is open to the constant pressure system contained in pipes 12a, 12 and 11.

I claim:

1. Pressure responsive apparatus comprising, in combination, means, including rigid walls and a diaphragm plate rigidly fixed around its edge to said walls, defining a space adapted to communicate with a source of fluid under pressure, a reciprocable member formed with a valve element and with spaced opposed piston faces of different areas adapted to receive fluid under pressure therebetween, said member being continuously in operative association with the centre of said diaphragm to follow movements thereof during the operation of the apparatus, a container formed with a bleeder port, guiding means for said reciprocable member, said guiding means being formed with a passage adapted to connect the space between said piston faces with the source of fluid under pressure and said valve element being adapted to vary the flow of fluid under pressure from said space between said pistons to said container, and means responsive to pressure changes in said container for controlling the pressure of the source of fluid under pressure, the pressure in said container varying in accordance with the relation between the continuous flow past said valve element into said container and the continuous flow through said bleeder port out of said container.

2. Pressure responsive apparatus comprising, in combination, a chamber in communication with fluid under pressure, a second chamber having a controlled bleeder port therein, a valve controlling flow of fluid from the first chamber to the second chamber, means responsive to a predetermined pressure in the first chamber for opening said valve to permit fluid to flow into said second chamber faster than it can escape from said second chamber through said bleed port, means for supplying fluid under pressure to said first chamber, and means responsive to pressure in said second chamber for controlling said pressure producing means.

3. Pressure responsive apparatus comprising, in combination, a chamber in communication with fluid under pressure, a second chamber having a controlled bleeder port therein, a valve controlling flow of fluid from the first chamber to the second chamber, means responsive to a predetermined pressure in the first chamber for opening said valve to permit fluid to flow into said second chamber through said bleed port, means for supplying fluid under pressure to said first chamber, means responsive to pressure in said second chamber for controlling said pressure producing means, a cylinder in communication with said second chamber, a controlled piston reciprocable in said cylinder and responsive to the pressure in said second chamber, a reaction spring acting on said controlled piston, and a throttle valve actuated by said controlled piston for controlling the pressure of the source of fluid under pressure.

4. Pressure responsive apparatus comprising, in combination, a chamber in communication with fluid under pressure, a second chamber having a controlled bleeder port therein, a valve controlling flow of fluid from the first chamber to the second chamber, means responsive to a predetermined pressure in the first chamber for opening said valve to permit fluid to flow into said second chamber faster than it can escape from said second chamber through said bleed port, means for supplying fluid under pressure to said first chamber, means responsive to pressure in said second chamber for controlling said pressure producing means, and a cylinder in communication with said second chamber, a controlled piston reciprocable in said cylinder, a reaction spring acting on said controlled piston, fluid operated servo-mechanism actuated by said controlled piston, and means responsive to said servo-mechanism for adjusting the pressure of the source of fluid under pressure.

ROLAND BENNETT.